(12) United States Patent
Talbot

(10) Patent No.: US 7,308,620 B1
(45) Date of Patent: Dec. 11, 2007

(54) METHOD TO OBTAIN THE WORST CASE TRANSMIT DATA AND JITTER PATTERN THAT MINIMIZES THE RECEIVER'S DATA EYE FOR ARBITRARY CHANNEL MODEL

(75) Inventor: Gerald Robert Talbot, Concord, MA (US)

(73) Assignee: Advanced Micro Devices, Inc., Sunnyvale, CA (US)

(*) Notice: Subject to any disclaimer, the term of this patent is extended or adjusted under 35 U.S.C. 154(b) by 528 days.

(21) Appl. No.: 11/033,760

(22) Filed: Jan. 13, 2005

(51) Int. Cl.
 *G06F 11/00* (2006.01)
 *H04L 7/00* (2006.01)
 *H04Q 1/20* (2006.01)

(52) U.S. Cl. ............... 714/707; 714/708; 714/798; 375/355; 375/226

(58) Field of Classification Search .............. None
 See application file for complete search history.

(56) References Cited

U.S. PATENT DOCUMENTS

| 6,920,402 B1* | 7/2005 | Liaw et al. ............... 702/57 |
| 7,218,670 B1* | 5/2007 | Lesea et al. ............. 375/226 |
| 2002/0027886 A1* | 3/2002 | Fischer et al. ........... 370/255 |
| 2005/0111536 A1* | 5/2005 | Cranford et al. ......... 375/226 |
| 2005/0163207 A1* | 7/2005 | Buckwalter et al. ...... 375/229 |

OTHER PUBLICATIONS

"Estimation of the Percentile Maximum Time Interval Error of Gaussian White Phase Noise" Bregni et al. IEEE International Conference on Communications, Jun. 8-12, 1997 pp. 1597-1601 vol. 3 Inspec Accession No. 579397.*

IBM Technical Disclosure Bulliten NN8804328 Data Coding for reducing Phase Jitter Apr. 1988 vol. 30 Issue11 pp. 328-329.*

M. Shimanouchi, et al. "An Approach to Consistent Jitter Modeling for Various Aspects and Measurement Methods", Proc. of IEEE International Test Conference (2001) 848-857.*

"AMD-3181™ HyperTransport™ PCI-X® Tunnel Data Sheet", 24637 Rev. 3.02, Aug. 10, 2004, pp. 1-87.

* cited by examiner

*Primary Examiner*—Cynthia Britt
(74) *Attorney, Agent, or Firm*—Manelli Denison & Selter PLLC; Leon R. Turkevich; Edward J. Stemberger

(57) ABSTRACT

A serial link system is provided for determining a worst-case cumulative data eye. The system includes a transmitter, a receiver, and a channel between the transmitter and receiver such that data sent by the transmitter is received by the receiver through the channel. The channel includes a plurality of connections including a victim and at least first and second aggressors, with the victim being disposed between the first and second aggressors. The system also includes a controller constructed and arranged to determine a worst case cumulative data eye based on a data pattern of the victim, jitter on the victim, an effect a data and jitter pattern on the first aggressor has on the victim and an effect a data and jitter pattern of the second aggressor has on the victim and to combine the effects of the data pattern of the victim, the jitter on the victim and the effects of the first and second aggressors on the victim into a single pattern to determine cumulative data eye for use in a simulator.

7 Claims, 4 Drawing Sheets

METHOD TO OBTAIN THE WORST CASE TRANSMIT DATA AND JITTER PATTERN THAT MINIMIZES THE RECEIVER'S DATA EYE FOR ARBITRARY CHANNEL MODEL

BACKGROUND OF THE INVENTION

1. Field of the Invention

The present invention relates to simulating a receive data eye of a high-speed serial interconnect and, more particularly, to finding a worst-case data and jitter pattern to minimize the size of a receiver's data eye.

2. Background Art

In designing a high-speed serial interconnect system, the distortion that a channel will introduce in a signal moving from one chip to another chip needs to be characterized. An example of such a system 10 is shown in FIG. 1, which includes a transmit die 12, a receive die 14 and a channel, generally indicated at 16, there-between. As used herein, "channel" is defined as the electrical connections from a transmit chip's die pad to another chip's die pad. The channel can include, at the transmit end, the physical package, any vias to enable the pin escape from the package to the printed circuit board (PCB), the physical etch on the PCB, any connectors used, and the mirror of these are provided at the receive end. The channel 16 can be considered a low-pass filter that applies a filtering function to a digital data stream. Thus, as the data rate increases, amplitude is reduced and data is shifted in time. It is thus important to know how much signal there is left by the time the signal arrives at the receiver.

If a data stream has a highly variable transition density, there are numerous complicated patterns that exist in the data. The transition density is the number of times the logic state for a bit changes within a certain number of bits. For example, in an 8B/10B coding, a maximum period of time without having a transition is five bit times. Thus, a worst-case transition density is one in five. In an un-encoded bus, the transition density can be much worse, e.g., 1 in 500. As the data rate increases, a propagation delay in bit times increases through the channel. Thus, since the propagation delay is multiple bit times (e.g., time it takes to transmit one bit), history of the data that was sent down the transmission line must be considered to determine what an arbitrary bit will do at the receiver (e.g., the analog voltage is a function of what was previously sent). The higher the data rate and the longer the channel, the more bits there are in transit that can interfere with the data pattern. Since the channel functions as a low pass filter, high frequency data patterns will get attenuated more than low frequency data patterns. This is one part of the history that impacts the size of the data eye. For example, if there is a long string of 0s and then a single 1 bit, the amplitude of the 1 bit would be compromised by the long string of 0s before it. Thus, a designer needs to know whether there is a large enough analog voltage to ensure that it can be received correctly.

Designers of high-speed serial systems must consider effects, as discussed above, of Inter-symbol Interference (ISI) caused by high frequency attenuation of the channel, and effects of reflections occurring at the receiver that cause reflected signals to travel towards the transmitter, with the transmitter reflecting the signals back to the receiver. These reflected signals interfere at some future time with a signal that is transmitted through the channel. Crosstalk is another effect that must be considered by designers, where, in a channel, there is a victim and on either side of the victim there are aggressors. The pattern on the aggressors couples into the victim pattern and thus can affect the size of the data eye of a bit. The victim contains the differential signals that are being sampled, and the aggressor channels contain differential signals that are adjacent to the measured signals but are coupled to the measured signals when the differential signal of an aggressor switches. The aggressor signals can occur in such a phase to reduce the amplitude of the measured signals. Finally, since the transmitter is not ideal, jitter of the transition time of a bit can be generated on its transmitted data pattern that can occur uncorrelated to the actual data pattern. Since the channel is a low-pass filter, if the jitter occurs in such a way that a bit time is compressed, it would get attenuated more by the channel than a bit time that is of a nominal width.

With above-mentioned effects occurring simultaneously, there is difficulty in determining size of the worst-case data bit in terms of time and amplitude. For a typical channel in a PCB environment, the settling time can be up to 40 bit times (e.g., the time for most of the energy of a pulse to decay away). Thus, for a worst-case receive bit, one must consider sequences of data and jitter that are of the order of 40 bits long and independent of each other.

A common way to analyze the above-mentioned effects is to use a time domain simulator such as SPICE to model various effects such as jitter, aggressor data patterns, etc. However, the time one can afford to run the simulation is a limiting factor. For example, when three or four variables that can have values of up to $2^{40}$ are cross product with each other, there are too many combinations of bit patterns to be simulated realistically. Conventionally, deterministic sequences are devised by hand to attempt to find a worst-case in the channel. Then, a pseudo-random data sequence is run to get some estimate of the worst-case data eye. However, this process requires much computation and thus a significant amount of time, and the process does not guarantee that the worst-case will be determined. There are very specific data patterns that will cause the worst case to occur and it there is a deviation from that data pattern, a much bigger worst-case data eye results.

SUMMARY OF THE INVENTION

Thus, there is a need for computing a worst-case data eye in a reasonable amount of time.

This and other needs are attainted by the present invention, where a method of determining a worst-case signal pattern of a serial link system provides a serial link system having a transmitter, a receiver and a channel between the transmitter and receiver such that data sent by the transmitter is received by the receiver through the channel, the channel including a plurality of connections including a victim and at least first and second aggressors, with the victim being disposed between the first and second aggressors. A data pattern having a plurality of bits is sent from the transmitter to the receiver along the victim, with all bits, but the last bit sent, being cleared and the last bit being set. An amplitude Y of the last bit is measured substantially at a center O of the last bit to determine an initial condition. The last bit remains set. The third from last bit is then set. An amplitude of the last bit is measured to determine whether setting of the third to last bit caused the amplitude of the last bit to change relative to the initial condition. If the setting of the third to last bit decreased the amplitude of the last bit, the setting of the third to last bit is maintained, and if the setting of the third to last bit maintained or increased the amplitude of the last bit, the third to last bit is cleared. Each bit that occurs in time before the third to last bit is sequentially set starting with the fourth to last bit and the effects setting each bit on the amplitude of the last bit is determined. The setting of each sequentially set bit is maintain or cleared to maintain or decrease the amplitude of the last bit and a victim data vector pattern is obtained.

Each of the aggressors and victim is constructed and arranged to deliver a data pattern defining a signal having the amplitude Y, a first crossing point X1 across a voltage threshold, and a second crossing point X2 across the voltage threshold, wherein Y is measured substantially at the center O of a bit time and $D_Y$ is a distance between O and Y, $D_{X1}$ is a distance between O and X1, and $D_{X2}$ is a distance between O and X2. The method further determines a baseline X1, X2 and Y for each bit of the victim. Edges of each transition of the data pattern of the victim are moved. Each sequential bit of the victim is set starting with the last bit. The setting of each sequential bit is maintained or cleared to obtain victim jitter patterns whereby $D_Y$, $D_{X1}$ and $D_{X2}$ are each minimized, since a pattern that provides the worst-case $D_Y$ may not be the pattern that provides the worst-case $D_{X1}$ or worst case $D_{X2}$.

In another aspect of the invention, the method includes sending a data pattern having a plurality of bits from the transmitter to the receiver along each aggressor using a phase of jitter that is the same as a phase of jitter used on the victim. Edges of each transition of the data pattern of each aggressor are moved and each sequential bit of a respective aggressor is set starting with the last bit. The setting of each sequential bit of the respective aggressor is maintained or cleared to obtain aggressor patterns whereby $D_Y$, $D_{X1}$ and $D_{X2}$ are each minimized. The victim data vector pattern, the victim jitter vector patterns, and the aggressor vector patterns are combined into a single pattern, and a cumulative data eye of the single pattern is determined.

In accordance with another aspect of the invention, a serial link system is provided for determining a worst-case cumulative data eye. The system includes a transmitter, a receiver, and a channel between the transmitter and receiver such that data sent by the transmitter is received by the receiver through the channel. The channel includes a plurality of connections including a victim and at least first and second aggressors, with the victim being disposed between the first and second aggressors. The system also includes a controller constructed and arranged to determine a worst case cumulative data eye based on a data pattern of the victim, jitter on the victim, an effect a data and jitter pattern on the first aggressor has on the victim and an effect a data and jitter pattern of the second aggressor has on the victim and to combine the effects of the data pattern of the victim, the jitter on the victim and the effects of the first and second aggressors on the victim into a single pattern to determine cumulative data eye for use in a simulator.

Additional advantages and novel features of the invention will be set forth in part in the description which follows and in part will become apparent to those skilled in the art upon examination of the following or may be learned by practice of the invention. The advantages of the present invention may be realized and attained by means of instrumentalities and combinations particularly pointed in the appended claims.

BRIEF DESCRIPTION OF THE DRAWINGS

Reference is made to the attached drawings, wherein elements having the same reference numeral designations represent like element elements throughout and wherein:

FIG. 1 is a prior art block diagram of a conventional high-speed serial interconnect system having a transmit die, a receive die, and a channel there-between.

BEST MODE FOR CARRYING OUT THE INVENTION

Figure 1:
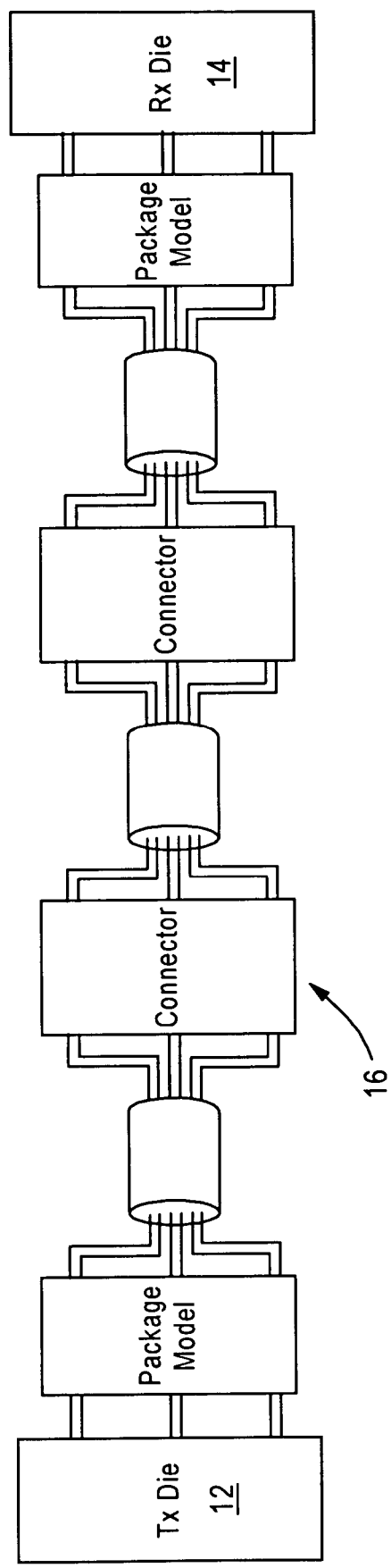
Figure 2:
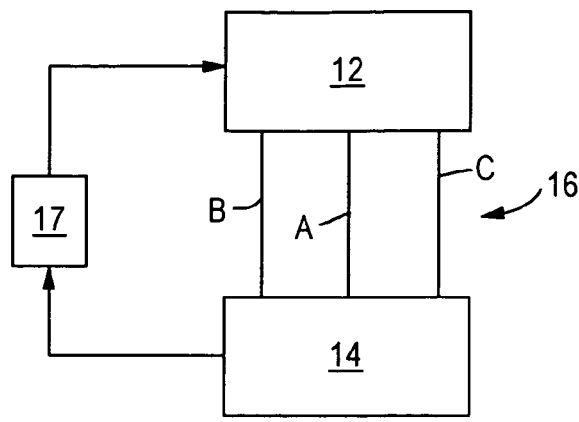
FIG. 2 is a diagram illustrating a testing system having a transmitter, a receiver, a channel there-between that includes three adjacent connections A, B, C, and a controller, according to an embodiment of the present invention.

The disclosed embodiment is directed to a system having integrated circuits, for example, microprocessors, memory controllers, host bridge devices, etc. that are linked via a high-speed serial link such as a HyperTransport™ link. With reference to FIG. 1, the system, generally indicated at 10, includes a transmit die 12, a receive die 14 and a channel 16 there-between. As noted above, the channel 16 is defined based on the electrical connections (e.g., PC board etch trace, and packages of the transmit die and receive die) from the transmit die 12 to the receive die 14. The transmit die (e.g., transmitter) 12 sends data and clock signals to the receive die (e.g., receiver) 14 by the channel 16. FIG. 2 shows is a simplified version of FIG. 1, showing the transmitter 12, the receiver 14, the channel 16 including three adjacent connections A, B, C, and a controller 17. Connection A is termed a victim and connections B and C are each termed aggressors. The controller 17 supplies the data to be transmitted by the transmitter 12 and executes software 19 to analyze data received by the receiver 14. FIG. 1 shows an example of differential signals being employed but, as discussed below with regard to FIG. 4, the signals can be single ended.

Figure 4:
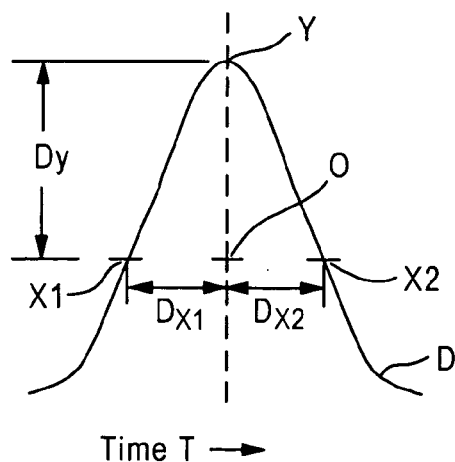
FIG. 4 shows a signal sent from a transmitter to a receiver that identifies Y, X1 and X2 in accordance with the invention.

With reference to FIG. 4, a signal D sent from transmitter 12 to the receiver 14 is shown. The center O of the bit time is shown at 90 degrees in FIG. 4. The height $D_Y$ of the data bit (amplitude Y) is a parameter to be minimized. Other parameters being minimized in the embodiment are the distance $D_{X1}$ and $D_{X2}$ where X1 is a first crossing point across a voltage threshold and X2 is a second crossing point across the voltage threshold. Thus, minimizing $D_{X1}$, $D_{X2}$, and $D_Y$ includes moving points X1, X2 and Y, respectively towards the center O of the data eye by changing the data pattern of the victim and on each aggressor, as will be explained below.

Figure 3:
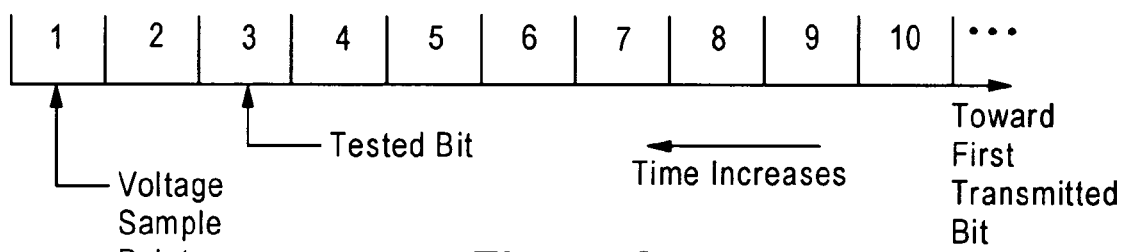
FIG. 3 shows a portion of a 40-bit data stream that is sent from the transmitter to the receiver in accordance with than embodiment of the present invention.

FIG. 3 shows a portion of a 40-bit vector that is sent from the transmitter 12 to the receiver 14 along connection A, or the victim. Bit 40 (not shown) is the bit that is transmitted first in time and bit 1 is the last bit of the vector that is received. With reference FIG. 5, step 100, if for example, a first vector of thirty nine "0s" was sent followed by a single "1" bit (bit 1 in FIG. 3), in accordance with the embodiment, the amplitude ($D_Y$) of bit 1 is measured (defining an initial condition at step 110) at the receiver 16 relative to the reference clock of the receiver 16. The reference clock of the receiver 16 is at the center of a data bit (e.g., bit1) when it arrives at the receiver 16. It is thus known that bit 1 will give a small bit (small amount of energy within 40 bit times).

Figure 5:
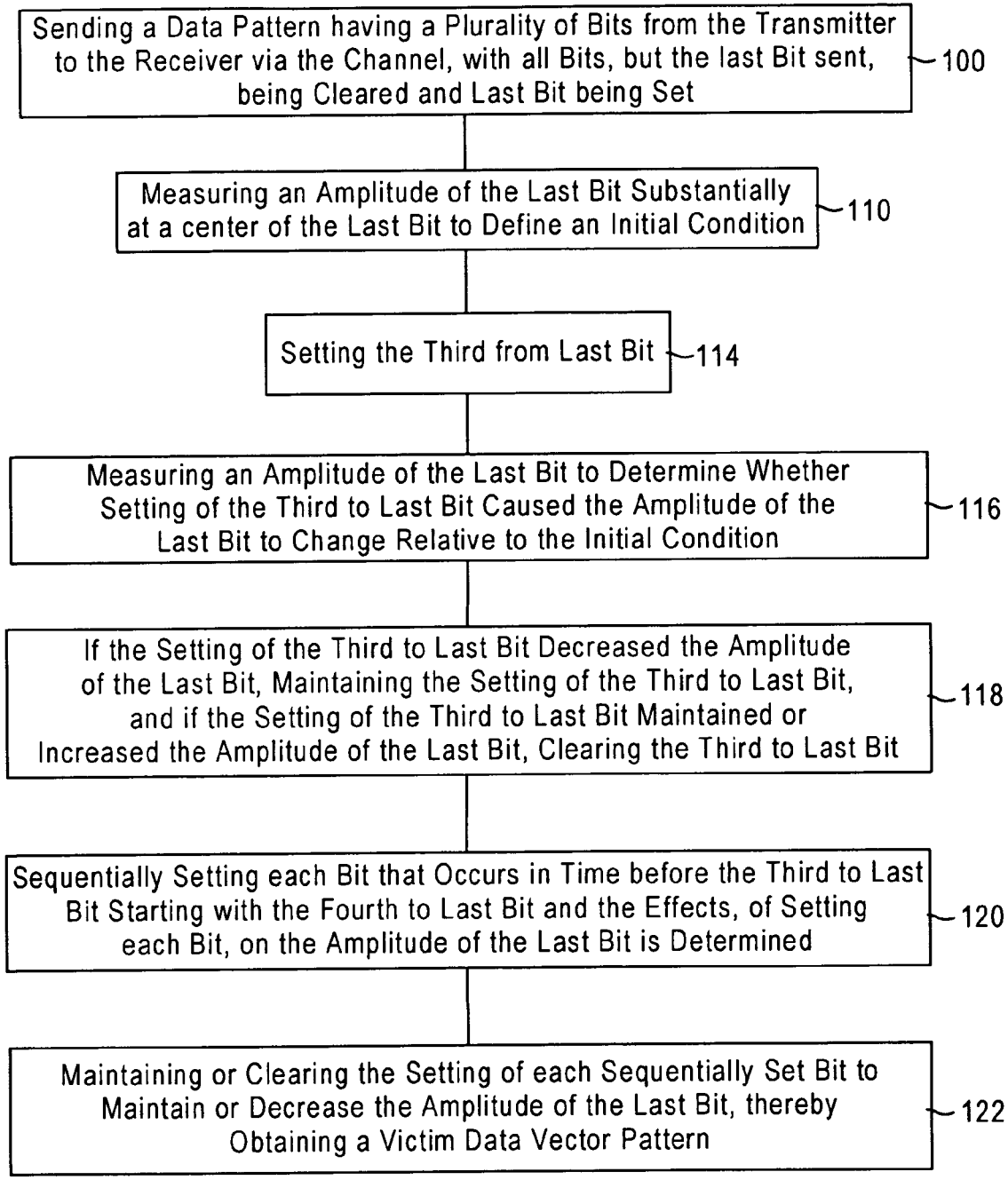
FIG. 5 is a flow diagram indicating a signal pattern testing method according to an embodiment of the invention.

In step 114 of FIG. 5, a second vector is created by keeping bit 1 set and setting bit 2 to 0 since the rising edge of bit 1 needs to be detected. Thus, the first bit of the second vector that is tested to determine the effects on bit one is bit 3, hence bit 3 of the second vector is set to 1 in step 114. In step 116, it is determined whether bit 3 has an effect on the size of bit 1 in the transmitted second vector (since bit 3 occurs prior to bit 1). In step 118, if the amplitude $D_Y$ of bit 1 at the center thereof becomes smaller than it was under the initial condition, bit 3 remains set. If bit 3 makes the amplitude $D_Y$ of bit 1 larger or does not change the amplitude of bit1 with reference to the initial condition of bit 1, bit 3 is cleared since the lowest voltage for bit 1 is needed to create the smallest (worst case) data eye. This procedure is continued for bits 4, 5, 6, etc. to bit 40 (step 120), setting and/or clearing each bit in each successively transmitted vector to tune the amplitude of bit 1 to be the smallest value (step 122). Thus, a victim data pattern of the 40 bit vector results, having groups of 1s set therein which is a function of the round-trip time of the data through connection A.

Next, the effects on the width of bit 1 of the victim (connection A of FIG. 2) needs to be determined since the pattern that provides that worst-case height $D_Y$ may not be the pattern that provides the worst-case width (e.g., $D_{X1}$ or $D_{X2}$).

It is important from the perspective of the receiver 16 to determine the cumulative eye, which involves taking every bit that is received by the receiver 16 and overlaying the bits on top of each other. To determine the cumulative data eye, one must determine the time when the bit transitions on the rising edge closest to the center O of the data eye and the time the bit transitions on the falling edge closest to the center O of the data eye. The pattern that generates the X1 closest to center O will be different from the pattern that generates the X2 closest to center O, which will be different from the pattern that generates the minimum Y (closest to center O in vertical direction).

Figure 6:
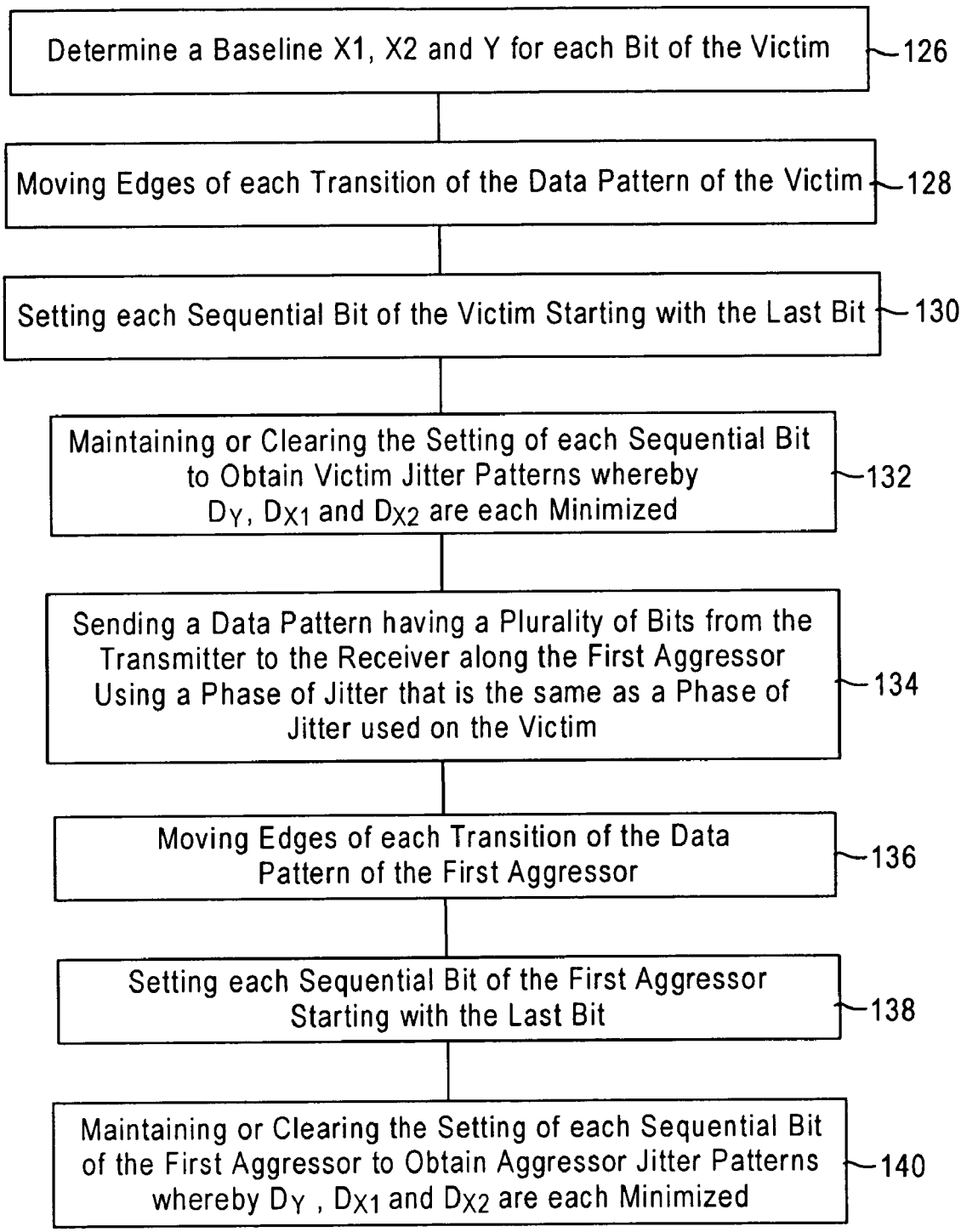
FIG. 6 is a flow diagram indicating a jitter testing method and effects of an aggressor according to an embodiment of the invention.

In accordance with the embodiment and with reference to FIG. 6, in step 126, X1, X2 and Y of the victim (connection A in FIG. 2) are determined and a baseline is established for each individual bit time. Next, the effect of jitter on the victim is determined. In particular, after obtaining, in step 126, the pattern for X1, X2 and Y, in step 128 of FIG. 6, the edges of each transition of that pattern are moved to obtain the X1, X2 and Y closest to the center O (e.g., minimizes $D_{X1}$ and $D_{X2}$ and $D_Y$). In other words, if a set bit on the victim (step 130) moves X1, X2 or Y of the victim closer to center O, then that bit remains set (step 132). Hence, victim jitter vector patterns are obtained.

Next, in step 134, a data pattern is transmitted on an aggressor (connection B in FIG. 2) while measuring effects on the victim (connection A) using the same phase of jitter on the aggressor as used on the victim. In step 136, the edges of each transition of the pattern on the aggressor are moved to obtain the X1, X2 and Y of the victim closest to the center O. In other words, if a set bit (step 138) on the aggressor (connection B) moves X1, X2 or Y of the victim closer to center O (e.g., minimizes $D_{X1}$ and $D_{X2}$ and $D_Y$) then that bit remains set (step 140). The above tests are repeated to determine the effects of the other aggressor(s) (e.g., connection C of FIG. 2) on the victim.

In a linear time and variance system superposition applies. Thus, each independent source of energy can be analyzed individually and then the sum of all sources of energy can be taken at the measurement point (e.g. a linear result). Superposition is used to reduce the number of combinations that need to be measured. Thus, for example, the data pattern on the aggressor can be treated independently from the data pattern on the victim. Applying convolution theory, if a bit stream of 40 bits is applied to the victim, the contribution of each one of the bits of the bit stream can be considered independently to determine what its effect will be at the receiver at some point in time.

Hence, once the worst-case vector patterns for the data of the victim, the victim's jitter, and the first aggressor (connection B) and the other aggressor (s) (connection C) are determined, these vector patterns can be combined using superposition and convolution theory into a single pattern to define a worst-case X1, a worst-case X2 and worst-case Y. From the single pattern obtained, a cumulative data eye can be plotted to display the worst-case data eye the receiver 16 will ever receive with that tested channel. Thus, although two aggressors have been described in the embodiment, it can be appreciated that the method disclosed herein is applicable also to more than two aggressors.

Thus, a method determines the worst-case contribution from four sources of distortion (ISI, reflection, cross-talk and jitter) of the data eye. By using the disclosed method and apparatus, there is no need to consider all of the permutations of all possible sources of distortion, but the sources distortion can be analyzed independently and the effects can be measured and combined to obtain a final data eye in a significantly shorter period of compute time as compare to conventional simulations.

The embodiment is used to generate data/parameters for use with a simulator such as SPICE. The embodiment can be used to determine if a particular channel in a system meets a certain specification, or a channel that one wants to have in the system can be used to set the specification of the silicon. The embodiment is particularly useful in configuring PCB layouts. Computationally, the embodiment is many orders of magnitude more efficient than a random pattern generation technique and is also guaranteed to fine the worst-case data eye of the system.

While this invention has been described with what is presently considered to be the most practical preferred embodiment, it is to be understood that the invention is not limited to the disclosed embodiments, but, on the contrary, is intended to cover various modifications and equivalent arrangements included within the spirit and scope of the appended claims.

What is claimed is:

1. A method determining a worst-case signal pattern of a serial link system, the method including:

providing a serial link system having a transmitter, a receiver and a channel between the transmitter and receiver such that data sent by the transmitter is received by the receiver through the channel, the channel including a plurality of connections including a victim and at least first and second aggressors, with the victim being disposed between the first and second aggressors, sending a data pattern having a plurality of bits from the transmitter to the receiver along the victim, with all bits, but the last bit sent, being cleared and last bit being set, measuring an amplitude of the last bit substantially at a center of the last bit to define an initial condition, setting the third from last bit, measuring an amplitude of the last bit to determine whether setting of the third to last bit caused the amplitude of the last bit to change relative to the initial condition, if the setting of the third to last bit decreased the amplitude of the last bit, maintaining the setting of the third to last bit, and if the setting of the third to last bit one of maintained and increased the amplitude of the last bit, clearing the third to last bit, sequentially setting each bit that occurs in time before the third to last bit starting with the fourth to last bit and the effects, of setting each bit, on the amplitude of the last bit is determined, selectively performing one of maintaining and clearing the setting of each sequentially set bit to one of maintain and decrease the amplitude of the last bit, thereby obtaining a victim data vector pattern.

2. The method of claim 1, wherein the transmitter is constructed and arranged such that each of the aggressors and victim delivers a signal having an amplitude Y, a first crossing point X1 across a voltage threshold, and a second crossing point X2 across the voltage threshold, wherein Y is measured substantially at a center O of a bit time and $D_Y$ is a distance between O and Y, $D_{X1}$ is a distance between O and X1, and $D_{X2}$ is a distance between O and X2, the method including:

determining a baseline X1, X2 and Y for each bit of the victim, moving edges of each transition of the data pattern of the victim, setting each sequential bit of the victim starting with the last bit, and selectively performing one of maintaining and clearing the setting of each sequential bit to obtain victim jitter patterns whereby $D_Y$, $D_{X1}$ and $D_{X2}$ are each minimized.

3. The method of claim 2, further including:

sending a data pattern having a plurality of bits from the transmitter to the receiver along the first aggressor using a phase of jitter that is the same as a phase of jitter used on the victim, moving edges of each transition of the data pattern of the first aggressor, setting each sequential bit of the first aggressor starting with the last bit, and selectively performing one of maintaining and clearing the setting of each sequential bit of the first aggressor to obtain first aggressor patterns whereby $D_Y$, $D_{X1}$ and $D_{X2}$ are each minimized.

4. The method of claim 3, further including:

sending a data pattern having a plurality of bits from the transmitter to the receiver along the second aggressor using a phase of jitter that is the same as a phase of jitter used on the victim, moving edges of each transition of the data pattern of the second aggressor, setting each sequential bit of the second aggressor starting with the third from last bit, and selectively performing one of maintaining and clearing the setting of each sequential bit of the second aggressor to obtain second aggressor patterns whereby $D_Y$, $D_{X1}$ and $D_{X2}$ are each minimized.

5. The method of claim 4, further including:

combining the victim data vector pattern, the victim jitter vector patterns, first aggressor vector patterns, and the second aggressor vector patterns into a single pattern, and determining a cumulative data eye of the single pattern.

6. A method in serial link system for determining a worst-case cumulative data eye for use in a simulator, the method including:

providing a serial link system having a transmitter, a receiver, a channel between the transmitter and receiver such that data sent by the transmitter is received by the receiver through the channel, the channel including a plurality of connections including a victim and at least first and second aggressors, with the victim being disposed between the first and second aggressors, and a controller, monitoring, at the controller, a data pattern of the victim, jitter on the victim, an effect a data and jitter pattern on the first aggressor has on the victim and an effect a data and jitter pattern of the second aggressor has on the victim, and combining the effects of the data pattern of the victim, the jitter on the victim and the effects of the first and second aggressors on the victim into a single pattern, determining a cumulative data eye of the single pattern, and sending the cumulative data eye to a simulator.

7. A serial link system for determining a worst-case cumulative data eye for use in a simulator, the system comprising:

a transmitter, a receiver, a channel between the transmitter and receiver such that data sent by the transmitter is received by the receiver through the channel, the channel including a plurality of connections including a victim and at least first and second aggressors, with the victim being disposed between the first and second aggressors, and a controller constructed and arranged to determine a worst case cumulative data eye based on monitoring a data pattern of the victim, jitter on the victim, an effect a data and jitter pattern on the first aggressor has on the victim and an effect a data and jitter pattern of the second aggressor has on the victim and to combine the effects of the data pattern of the victim, the jitter on the victim and the effects of the first and second aggressors on the victim into a single pattern to determine cumulative data eye for use in a simulator.

* * * * *